(12) United States Patent
Salli

(10) Patent No.: US 7,711,979 B2
(45) Date of Patent: May 4, 2010

(54) METHOD AND APPARATUS FOR FLEXIBLE ACCESS TO STORAGE FACILITIES

(75) Inventor: Tommi Salli, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 471 days.

(21) Appl. No.: 11/707,688

(22) Filed: Feb. 16, 2007

(65) Prior Publication Data

US 2008/0201458 A1      Aug. 21, 2008

(51) Int. Cl.
*G06F 11/00* (2006.01)

(52) U.S. Cl. .............................. 714/4; 714/3
(58) Field of Classification Search ............ 714/4, 714/3
See application file for complete search history.

(56) References Cited

U.S. PATENT DOCUMENTS

| | | |
|---|---|---|
| 6,622,163 B1 | 9/2003 | Tawill et al. |
| 6,971,016 B1 | 11/2005 | Barnett |
| 7,093,120 B2 | 8/2006 | Keohane et al. |
| 7,346,800 B2 * | 3/2008 | Hatasaki et al. ............... 714/3 |
| 7,454,652 B2 * | 11/2008 | Haga et al. ..................... 714/4 |
| 7,500,134 B2 * | 3/2009 | Madnani et al. ............... 714/4 |
| 2002/0194294 A1 * | 12/2002 | Blumenau et al. ........... 709/213 |
| 2003/0131182 A1 * | 7/2003 | Kumar et al. ................. 711/5 |
| 2005/0268152 A1 * | 12/2005 | Yamaguchi et al. .......... 714/4 |
| 2007/0027973 A1 * | 2/2007 | Stein et al. ................. 709/223 |
| 2007/0226532 A1 * | 9/2007 | Matsuda ....................... 714/4 |
| 2008/0177871 A1 * | 7/2008 | Howard et al. ............. 709/222 |
| 2008/0235533 A1 * | 9/2008 | Hatasaki et al. ............... 714/4 |
| 2008/0276120 A1 * | 11/2008 | Yamamoto et al. ............. 714/4 |

OTHER PUBLICATIONS

International Search Report and Written Opinion mailed Jun. 26, 2008 for PCT Application No. PCT/US2008/002064.

* cited by examiner

*Primary Examiner*—Marc Duncan
(74) *Attorney, Agent, or Firm*—Moser IP Law Group

(57) ABSTRACT

A method and apparatus for providing flexible access to storage resources in a storage area network is provided. One aspect of the invention relates to managing hosts and storage resources on a storage area network. At least one logical relationship among the storage resources is associated with each of a plurality of virtual identifiers. At least one of the plurality of virtual identifiers is then associated to an interface of each of the hosts.

11 Claims, 3 Drawing Sheets

METHOD AND APPARATUS FOR FLEXIBLE ACCESS TO STORAGE FACILITIES

BACKGROUND OF THE INVENTION

1. Field of the Invention

The present invention generally relates to computers and, more particularly, to techniques for providing flexible access to the resources in one or more storage facilities.

2. Description of the Background Art

In storage area network (SAN) based data centers, storage access and connectivity are provisioned in advance. For example, in a SAN cluster each node is configured so that each node can access all the storage resources each node may ever need, even if a given node is not using all the storage capacity at any particular moment. Each storage device must also be provisioned to and individually configured for all the nodes in the SAN cluster. This process is error prone and makes adding new resources to the cluster difficult. Fast and flexible data migration from one server host to another currently requires significant planning and reconfiguration phase. In cases where there is a physical host bus adapter (HBA) failure on a host and that HBA needs to be replaced, the configuration for that particular host has to be confirmed and/or redone to make sure that the connectivity between the host and the storage resources still exist. Where configuration changes are common and complex, significant resources are required to perform host failover recovery and/or data migration. There is a need, therefore, to address the above-mentioned problems.

SUMMARY OF THE INVENTION

A method and apparatus for providing flexible access to storage resources in a storage area network is provided. One aspect of the invention relates to managing hosts and storage resources on a storage area network. At least one logical relationship among the storage resources is associated with each of a plurality of virtual identifiers. At least one of the plurality of virtual identifiers is then associated to an interface of each of the hosts.

BRIEF DESCRIPTION OF THE DRAWINGS

So that the manner in which the recited features of the present invention can be understood in detail, a more particular description of the invention, briefly summarized below, can be had by reference to embodiments, some of which are illustrated in the appended drawings. It is to be noted, however, that the appended drawings illustrate only some of the embodiments of this invention and are therefore not to be considered limiting of its scope, for the invention can admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
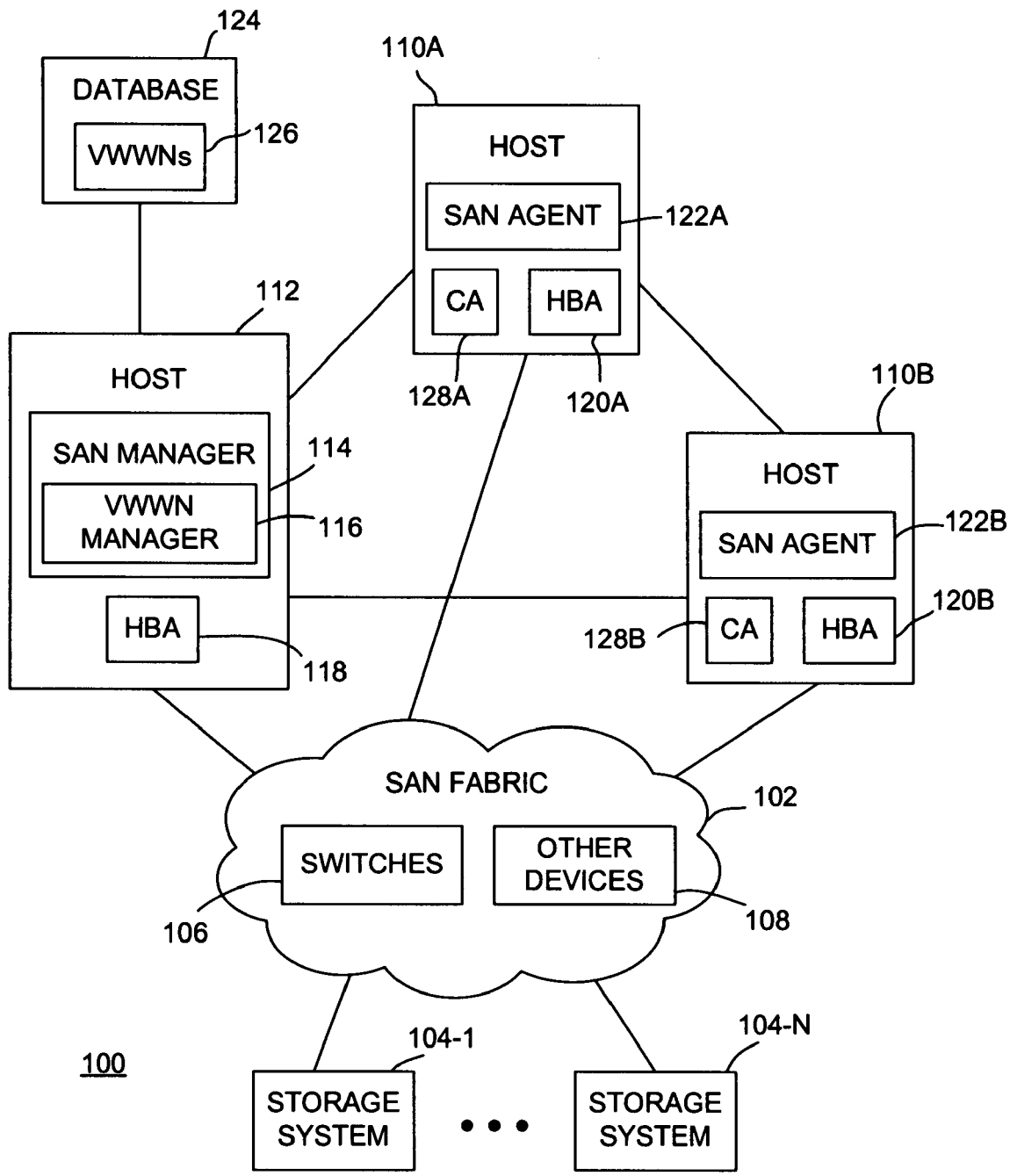
FIG. 1 is a block diagram depicting an exemplary embodiment of a storage area network (SAN) in accordance with one or more aspects of the invention.

FIG. 1 is a block diagram depicting an exemplary embodiment of a storage area network (SAN) 100 in accordance with one or more aspects of the invention. The SAN 100 includes a SAN fabric 102, storage systems 104-1 through 104-N (collectively storage systems 104), hosts 110A and 110B, and a host 112. The SAN fabric 102 enables host-to-storage device connectivity through a switching technology, such as Fiber Channel (FC) switching technology. The SAN fabric 102 may include one or more switches 106 and other devices 108, such as bridges, hubs, routers, interconnecting cables (e.g., fiber optic cables), and the like. Each of the storage systems 104 may include various storage resources, including but not limited to Redundant Array of Independent Disks (RAID) systems, disk arrays, JBOD's (Just a Bunch Of Disks, used to refer to disks that are not configured according to RAID), tape devices, and optical storage devices. The storage systems 104 are coupled to the SAN fabric 102.

The host 112 includes a SAN manager 114 and a host bus adapter (HBA) 118. The host 112 is coupled to a database 124. The HBA 118 provides an interface between the host 112 the SAN fabric 102. The SAN manager 114 is generally configured to discover SAN devices, such as hosts, HBAs, switches, storage devices, and the like. The SAN manager 114 maintains a data store of real-time object information to manage the SAN resources, monitor conditions on the SAN, and perform policy-based actions in response to SAN conditions. For example, the SAN manager 114 may manage storage resources through zoning and logical unit number (LUN) access control. Zoning is a security mechanism that is utilized to control access between devices in a SAN fabric. By creating and managing zones, a user may control host access to storage resources.

A LUN is the SCSI (Small Computer System Interface) identifier of a logical unit within a target, which is the system component that receives a SCSI I/O command. A logical unit is an entity within a SCSI target that executes I/O commands. SCSI I/O commands are sent to a target and are executed by a logical unit within that target. A SCSI physical disk typically has a single logical unit. Tape drives and array controllers may incorporate multiple logical units to which I/O commands can be addressed. LUN access control is the collective name given to the operations involved in making storage resources in the storage systems 104 available to hosts on the SAN 100 (e.g., hosts 110A and 110B), and may include LUN locating or searching, LUN binding, and/or LUN masking. LUN security provides granular control over a host's access to individual LUN's within an array or other collection of potentially heterogeneous storage devices. LUN binding is generally defined as the creation of access paths between LUN's within a disk array and ports on the array. LUN masking is generally defined as enabling access to LUN's for host HBA ports.

The host 110A includes a SAN agent 122A and an HBA 120A. Similarly, the host 110B includes a SAN agent 122B and an HBA 122B. The hosts 110A and 110B are configured for communication with the host 112. The hosts 110A and 110B may also be configured for communication with each other. The HBAs 120A and 120B are configured to provide respective interfaces between the hosts 110A and 110B and the SAN fabric 102. The SAN agents 122A and 122B assist the SAN manager 114 in discovering and managing the SAN 100. The SAN agents 122A and 122B are typically configured to communicate with the SAN manager 114 using various protocols to provide information about the hosts 110A and 110B, respectively. For purposes of clarity by example, only two hosts 110A and 110B are shown in the SAN 100. Those skilled in the art will appreciate that the SAN 100 may include more than two hosts 110 managed by the host 112. Furthermore, those skilled in the art will appreciate that one or more end-user platforms (not shown) may access the SAN 100, typically via a LAN or WAN connection to one or more of the hosts 110.

A world wide name (WWN) is an identifier generally used to assist with SAN management, including compartmentalization, authorization, and securitization. Conventionally, each SAN device such as an HBA includes one or more physical ports, each of which is assigned a unique WWN at manufacture. The WWNs are used to associate a device, such as an HBA, with various logical storage device relationships, such as zones and LUN access controls. A user must configure these associations each time a new device is connected to the SAN.

In accordance with one aspect of the invention, the SAN manager 114 includes a virtual world wide name (VWWN) manager 116. The VWWN manager 116 creates and manages virtual WWNs (VWWNs). Each VWWN is associated with one or more logical relationships among storage resource in the storage systems 104 (e.g., zones and/or LUN access controls). The VWWNs and their associations may be stored in the database 124 ("VWWNs 126"). The VWWN manager 116 assigns at least one VWWN to the HBA of each of the hosts it manages (e.g., the HBAs 120A and 120B of the hosts 110A and 110B). The HBAs 120A and 120B use the assigned VWWNs, rather then the WWNs that were provisioned during manufacture. The assigned VWWNs allow the hosts 110A and 110B to access specific storage resources in accordance with the corresponding logical relationships established by the host 112. Thus, the specific resources to which a given host has access may be changed dynamically by assigning different VWWNs to the host HBAs.

In one embodiment, multiple VWWNs are assigned to an HBA using N-port ID virtualization (NPIV). NPIV is part of the T11 fiber channel standard set forth by the International Committee for Information Technology Standards (INCITS), which is well known in the art. NPIV provides a FC facility for sharing a single physical N_port of an HBA among multiple N_port IDs (e.g., WWNs). This allows multiple initiators, each with its own N_port ID, to share the physical N_port. In this manner, multiple VWWNs may be assigned to a single physical port of an HBA.

The VWWN manager 116 obviates the need to provision storage access and connectivity at the hosts 110 in advance. Thus, it is not necessary to configure a given host to access storage resources that the host does not currently need to access, but rather may need to access in the future. If the host ever needs to access such storage resources, a VWWN may be dynamically assigned to the host to provide such access. In addition, new hosts and/or HBAs may be added to the SAN 100 more easily. Such new hosts and/or HBAs are connected with the desired storage resources by assigning the appropriate VWWNs.

The use of VWWNs also facilitates host failover. Notably, in some embodiments, hosts of the SAN 100 may be configured as a cluster. If one host experiences a hardware and/or software failure, one or more services provided by the host are failed over to another host in the cluster. Thus, in one embodiment, the hosts 110A and 110B include cluster agents (CAs) 128A and 128B, respectively. The cluster agents 128A and 128B are configured to monitor for failures and manage failover of resources among the hosts 110.

Assume the host 110A is assigned a first VWWN that provides access to a first group of storage resources in the storage system 104. The host 110A executes an application that reads information from, and stores information to, the first group of storage resources. Assume further that the host 110B is configured to assume execution of the application in case of failure at the host 110A. However, the host 110B does not normally require access to the first group of storage resources. Thus, as described above, it is not necessary to configure the host 110B to be able to access the first group of storage resources (e.g., the HBA 120B is not assigned the first VWWN).

Now assume that the CA 128B of the host 110B detects a failure of the application on the first host 110A. For example, the application may have crashed or the first host 110A may some other type of failure rendering it inoperable. The CA 128B instructs the CA 128A to release the first VWWN being used by the HBA 120A. If the host 110A is unable to respond to the request, the CA 128B may send a request to the SAN manager 114 that the first VWWN be released from the HBA 120A. The first VWWN is then assigned to the HBA 120B. The assignment may be performed by the CA 128B or by the VWWN manager 116 (which may have been notified of the failure by the CA 128B). Thus, the host 110B now has access to the first group of storage resources. The CA 128B then starts execution of the application at the host 110B, which can now continue to read data from, and store data to, the first group of resources.

Figure 2:
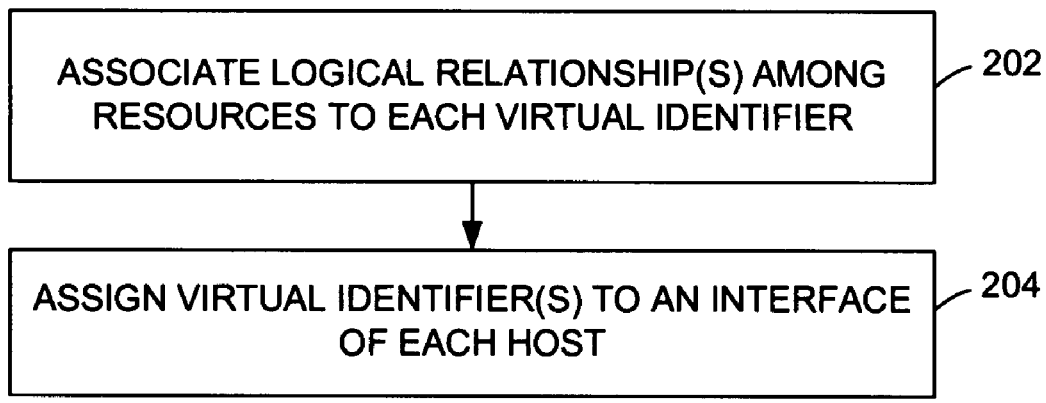
FIG. 2 is a block diagram depicting an exemplary embodiment of a method for managing hosts and storage resources on a SAN in accordance with one or more aspects of the invention.

FIG. 2 is a block diagram depicting an exemplary embodiment of a method 200 for managing hosts and storage resources on a SAN in accordance with one or more aspects of the invention. The method 200 begins at step 202, where one or more logical relationships among the storage resources is/are associated with each of a plurality of virtual identifiers. In one embodiment, each of the virtual identifiers is a unique VWWN, as described above. Each of the logical relationships may comprise zones and/or LUN access controls, as described above. In general, a logical relationship assigned to a virtual identifier may be any type of logical grouping of the storage resources. The term "storage resource" is meant to encompass both physical storage devices, as well as logical storage areas, such as storage volumes. At step 204, one or more virtual identifiers is/are assigned to one or more host interfaces in the SAN. In one embodiment, the host interfaces comprise HBAs, as described above. A host interface may be assigned its virtual identifiers using NPIV.

Figure 3:
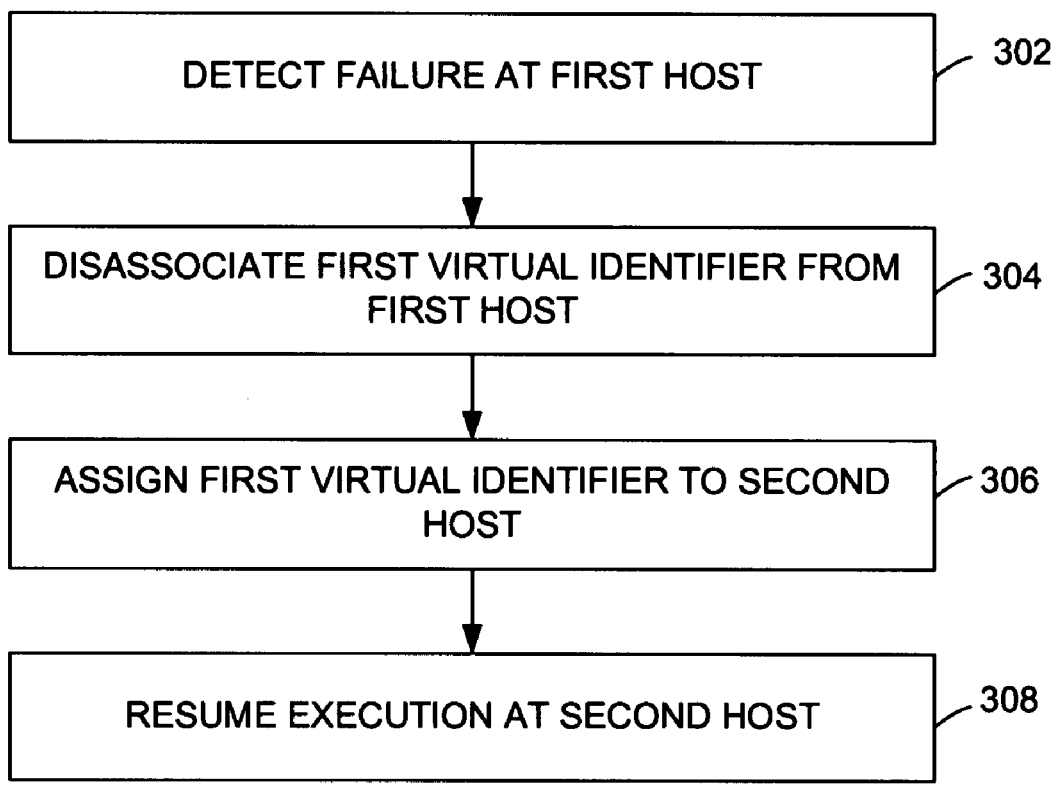
FIG. 3 is a flow diagram depicting an exemplary embodiment of a method for failover of hosts of a SAN in accordance with one or more aspects of the invention.

FIG. 3 is a flow diagram depicting an exemplary embodiment of a method 300 for failover of hosts of a SAN in accordance with one or more aspects of the invention. The method 300 begins at step 302, where a failure is detected at a first host. At step 304, a first virtual identifier is disassociated from the first host. The first virtual identifier enables a host to access a specific group of storage resources. At step 306, the first virtual identifier is assigned to the second host. This enables the second host to access the specific group of storage resources previously used by the first host. At step 308, execution is resumed at the second host. Thus, the first host is failed over to the second host.

Figure 4:
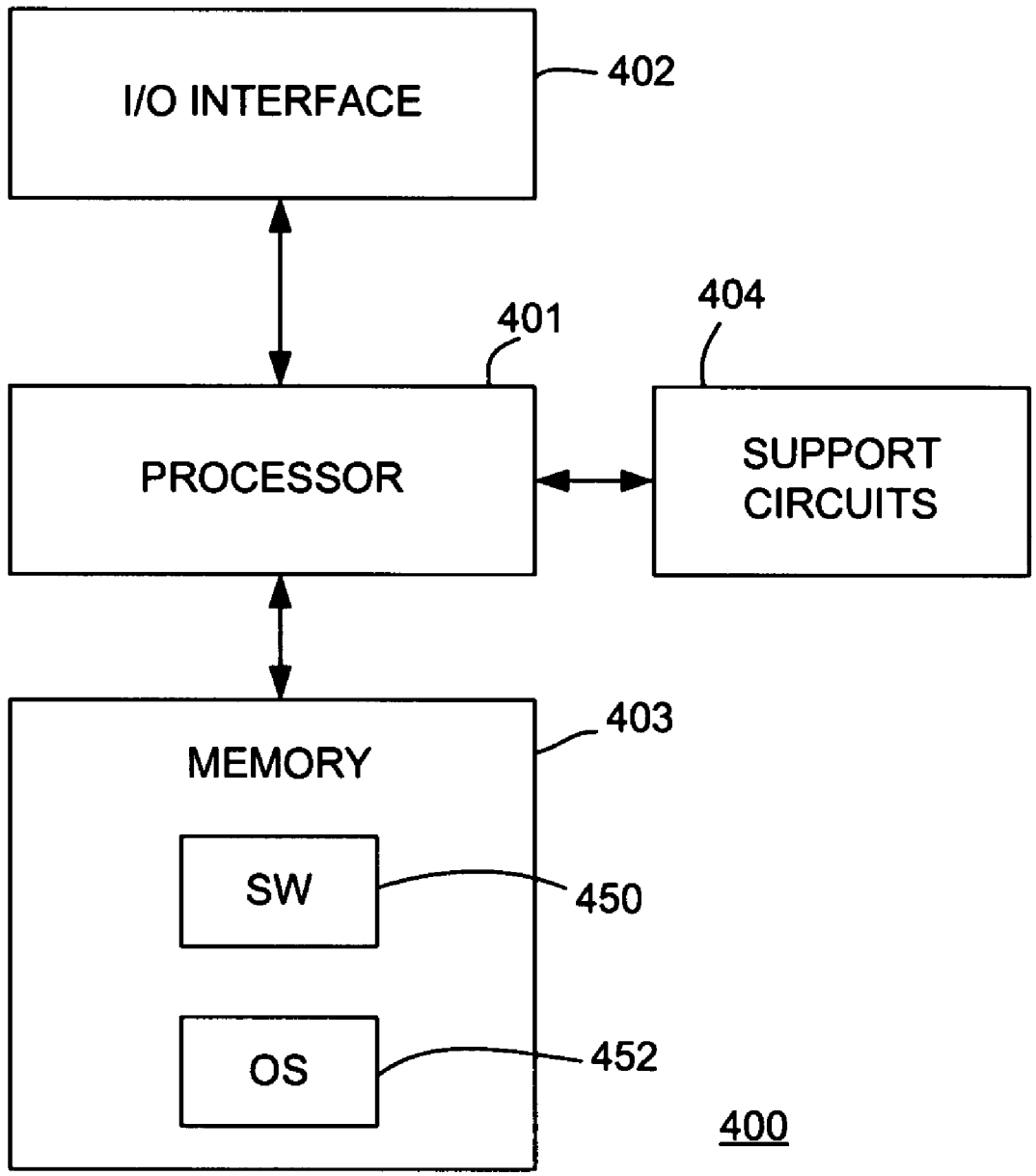
FIG. 4 is a block diagram depicting an exemplary embodiment of a computer system in accordance with one or more aspects of the invention.

FIG. 4 is a block diagram depicting an exemplary embodiment of a computer system 400 in accordance with one or more aspects of the invention. The computer system 400 may be used to implement any one of the hosts 110 or the host 112. The computer system 400 includes a processor 401, a memory 403, various support circuits 404, and an I/O interface 402. The processor 401 may include one or more microprocessors known in the art. The support circuits 404 for the processor 401 include conventional cache, power supplies, clock circuits, data registers, I/O interfaces, and the like. The I/O interface 402 may be directly coupled to the memory 403 or coupled through the processor 401. The I/O interface 402 may also be configured for communication with a network, with various storage devices, as well as other types of input devices 411 and output devices 412 (e.g., mouse, keyboard, display, etc).

The memory 403 stores processor-executable instructions and/or data that may be executed by and/or used by the processor 401. These processor-executable instructions may comprise hardware, firmware, software, and the like, or some combination thereof. Software 450 having processor-executable instructions that are stored in the memory 403 may implement the SAN manager 114, the VWWN manager 116, the SAN agent 122, and/or the duster agent 120. The computer system 400 may be programmed with an operating system 450, which may be OS/2, Java Virtual Machine, Linux, Solaris, Unix, Windows, Windows95, Windows98, Windows NT, and Windows2000, WindowsME, and WindowsXP, Windows Server, among other known platforms. At least a portion of an operating system 450 may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention can be devised without departing from the basic scope thereof, and the scope thereof is determined by the claims that follow.

The invention claimed is:

1. A method of managing hosts and storage resources on a storage area network (SAN), comprising:
 associating at least one logical relationship among the storage resources to each of a plurality of virtual identifiers wherein each of the plurality of virtual identifiers comprises a virtual world wide name (VWWN); and
 assigning at least one of the plurality of virtual identifiers to an interface of each of the hosts wherein the hosts are configured to communicate with the storage resources using a SAN fabric, and wherein interface of each of the hosts comprises a host bus adapter (HBA) coupled to the SAN fabric and wherein the SAN fabric comprises a fiber channel (FC) fabric, and wherein at least one of the plurality of virtual identifiers is assigned to the interface of each of the hosts using N-port ID virtualization (NPIV).

2. The method of claim 1, wherein the hosts includes a first host and a second host, wherein the step of assigning comprises assigning a first virtual identifier to the first host, and wherein the method further comprises:
 detecting a failure in an application at the first host;
 disassociating the first virtual identifier with the first host;
 assigning the first virtual identifier to the second host; and
 resuming execution of the application at the second host.

3. The method of claim 1, wherein the at least one logical relationship associated with each of the plurality of virtual identifiers comprises at least one of zones or logical unit number (LUN) access controls associated with the storage resources.

4. The method of claim 1, further comprising:
 storing the at least one logical relationship associated with each of the plurality of virtual identifiers in a configuration database.

5. Apparatus for managing hosts and storage resources on a storage area network (SAN), comprising:
 means for associating at least one logical relationship among the storage resources to each of a plurality of virtual identifiers;
 means for assigning at least one of the plurality of virtual identifiers to an interface of each of the hosts;
 means for detecting a failure in an application at the first host;
 means for disassociating the first virtual identifier with the first host;
 means for assigning the first virtual identifier to the second host; and
 means for resuming execution of the application at the second host;
 and wherein the hosts includes a first host and a second host, wherein the means for assigning comprises assigning a first virtual identifier to the first host, and wherein the apparatus further comprises, wherein the hosts are configured to communicate with the storage resources using a SAN fabric, and wherein interface of each of the hosts comprises a host bus adapter (HBA) coupled to the SAN fabric, wherein each of the plurality of virtual identifiers comprises a virtual world wide name (VWWN), and wherein the SAN fabric comprises a fiber channel (FC) fabric, and wherein at least one of the plurality of virtual identifiers is assigned to the interface of each of the hosts using N-port ID virtualization (NPIV).

6. The apparatus of claim 5, wherein the at least one logical relationship associated with each of the plurality of virtual identifiers comprises at least one of zones or logical unit number (LUN) access controls associated with the storage resources.

7. A storage area network (SAN), comprising:
a plurality of storage resources;
a plurality of hosts;
a SAN fabric configured to couple the hosts to the storage resources;
the plurality of hosts including a plurality of interfaces to the SAN fabric and a virtual identifier manager, the virtual identifier manager configured to associate at least one logical relationship among the storage resources to each of a plurality of virtual identifiers and assign at least one of the plurality of virtual identifiers to each of the plurality of interfaces, wherein each of the plurality of interfaces comprises a host bus adapter (HBA), and wherein the SAN fabric comprises a fiber channel (FC) fabric, and wherein at least one of the plurality of virtual identifiers is assigned to the interface of each of the hosts using N-port ID virtualization (NPIV).

8. The SAN of claim 7, wherein each of the plurality of virtual identifiers comprises a virtual world wide name (VWWN).

9. The SAN of claim 7, wherein the at least one logical relationship associated with each of the plurality of virtual identifiers comprises at least one of zones or logical unit number (LUN) access controls associated with the plurality of storage resources.

10. The SAN of claim 7, wherein the virtual identifier manager is part of a SAN manager implemented by one of the plurality of hosts.

11. The SAN of claim 10, further comprising:
a configuration database, coupled to the one of the plurality of hosts, configured to store the plurality of virtual identifiers.

\* \* \* \* \*